US011289080B2

(12) United States Patent
Lakshminarayana et al.

(10) Patent No.: US 11,289,080 B2
(45) Date of Patent: Mar. 29, 2022

(54) SECURITY TOOL

(71) Applicant: Bank of America Corporation, Charlotte, NC (US)

(72) Inventors: Nagasubramanya Lakshminarayana, Hyderabad (IN); Udaya Kumar Raju Ratnakaram, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 16/599,565

(22) Filed: Oct. 11, 2019

(65) Prior Publication Data

US 2021/0110819 A1   Apr. 15, 2021

(51) Int. Cl.
| | |
|---|---|
| *G10L 15/22* | (2006.01) |
| *H04M 3/42* | (2006.01) |
| *G10L 15/26* | (2006.01) |
| *H04M 3/487* | (2006.01) |
| *G06Q 20/10* | (2012.01) |
| *G06Q 20/32* | (2012.01) |
| *G06Q 20/40* | (2012.01) |

(52) U.S. Cl.
CPC .............. *G10L 15/22* (2013.01); *G06Q 20/10* (2013.01); *G06Q 20/325* (2013.01); *G06Q 20/3227* (2013.01); *G06Q 20/40145* (2013.01); *G10L 15/26* (2013.01); *H04M 3/42221* (2013.01); *H04M 3/487* (2013.01); *G10L 2015/223* (2013.01); *H04M 2201/405* (2013.01)

(58) Field of Classification Search
CPC ... G10L 15/22; G10L 15/26; G10L 2015/223; G10L 17/06; H04M 3/42221; H04M 3/487; H04M 2201/405; G06Q 20/10; G06Q 20/3227; G06Q 20/325; G06Q 20/40145; H04L 9/3231
USPC ....................................................... 704/275
See application file for complete search history.

(56) References Cited

U.S. PATENT DOCUMENTS

| | | |
|---|---|---|
| 6,167,368 A | 12/2000 | Wacholder |
| 6,246,981 B1 | 6/2001 | Papineni et al. |
| 6,285,978 B1 | 9/2001 | Bernth et al. |
| 6,823,054 B1 | 11/2004 | Suhm et al. |
| 6,879,685 B1 | 4/2005 | Peterson et al. |
| 6,882,723 B1 | 4/2005 | Peterson et al. |
| 6,898,277 B1 | 5/2005 | Meteer et al. |
| 6,904,143 B1 | 6/2005 | Peterson et al. |
| 6,922,466 B1 | 7/2005 | Peterson et al. |
| 6,937,705 B1 | 8/2005 | Godfrey et al. |
| 6,970,554 B1 | 11/2005 | Peterson et al. |
| 7,003,079 B1 | 2/2006 | McCarthy et al. |
| 7,039,166 B1 | 5/2006 | Peterson et al. |

(Continued)

*Primary Examiner* — Md S Elahee (57) ABSTRACT

A memory stores a first voice record of a first user and a second voice record of a second user. A processor receives from a device of the first user a recording of a voice conversation between the first and second users and compares the recording with the first and second voice records to determine that the voice conversation is between the first and second users. The processor also determines that the first and second users intend to conduct a transaction with each other and determines a transaction amount for the transaction. The processor further communicates, to the device of the first user, a message, receives, from the device of the first user, a confirmation of the transaction in response to the message, and in response to the confirmation, initiates the transaction.

20 Claims, 3 Drawing Sheets

(56) References Cited

U.S. PATENT DOCUMENTS

| | | |
|---|---|---|
| 7,092,888 B1 | 8/2006 | McCarthy et al. |
| 7,277,854 B2 | 10/2007 | Bennett et al. |
| 7,392,174 B2 | 6/2008 | Freeman |
| 7,624,007 B2 | 11/2009 | Bennett |
| 7,873,519 B2 | 1/2011 | Bennett |
| 7,933,773 B1 | 4/2011 | Gorin et al. |
| 8,385,526 B2 | 2/2013 | Smelyansky et al. |
| 8,416,937 B2 | 4/2013 | Bentley et al. |
| 8,515,045 B2 | 8/2013 | Croak et al. |
| 8,712,759 B2 | 4/2014 | Ylonen |
| 9,154,631 B2 | 10/2015 | Goguen et al. |
| 9,201,865 B2 | 12/2015 | Tran |
| 9,245,254 B2 | 1/2016 | Lord et al. |
| 9,635,061 B2 | 4/2017 | McCormack et al. |
| 9,668,024 B2 | 5/2017 | Os et al. |
| 9,711,137 B2 | 7/2017 | Baldwin |
| 9,842,105 B2 | 12/2017 | Bellegarda |
| 9,966,068 B2 | 5/2018 | Cash et al. |
| 10,049,667 B2 | 8/2018 | Heck et al. |
| 10,296,160 B2 | 5/2019 | Shah et al. |
| 10,482,885 B1 * | 11/2019 | Moniz .................... G10L 17/06 |
| 2005/0228657 A1 | 10/2005 | Chou et al. |
| 2006/0206310 A1 | 9/2006 | Ravikumar et al. |
| 2010/0318398 A1 | 12/2010 | Brun et al. |
| 2011/0119047 A1 | 5/2011 | Ylonen |
| 2013/0103391 A1 | 4/2013 | Millmore et al. |
| 2013/0144619 A1 | 6/2013 | Lord et al. |
| 2015/0003595 A1 | 1/2015 | Yaghi et al. |
| 2016/0357728 A1 | 12/2016 | Bellegarda et al. |
| 2017/0092278 A1 | 3/2017 | Evermann et al. |
| 2018/0096355 A1 * | 4/2018 | Studnicka ........ G06Q 20/40145 |
| 2020/0351095 A1 * | 11/2020 | Yadav ................... H04L 9/3231 |

* cited by examiner

SECURITY TOOL

TECHNICAL FIELD

This disclosure relates generally to data security.

BACKGROUND

Online and digital transactions frequently involve the communication of personal information over networks.

SUMMARY OF THE DISCLOSURE

Online and digital transactions frequently involve the communication of personal information over networks. This personal information may be compromised in a number of ways. For example, the personal information may be taken by malicious users from any repository or device to which the personal information is communicated. As another example, the personal information may be intercepted in transit by malicious users. As yet another example, the personal information may be copied by a keylogger as the information is provided. These malicious users may then use the personal information to impersonate other users or sell the personal information to other malicious actors.

Online and digital transaction may also involve several different steps where a user provides personal information before the transaction is initiated. For example, if a user wants to make a digital purchase, a user may provide authentication credentials (e.g., username and password) to login to a website. After selecting a product or service, the user may provide identifying information such as a real name or address. The user may also provide payment information such as a card number. Each of these types of information may be provided in separate steps and in different network messages. Some researchers have found that an online or digital transaction may involve twelve or more different steps where a user's personal information is provided, communicated, and/or stored. The user's information may be compromised in each of these twelve steps. Once compromised, a malicious user may use the personal information to impersonate the user (e.g., to conduct unauthorized transactions).

This disclosure contemplates a security tool that improves the security of information (e.g., personal information) during online and digital transactions. The security tool allows two or more users to conduct a transaction with each other by analyzing the users' voices. The security tool processes a recording of a conversation involving the users and authenticates the users by comparing the recording against voice records. The security tool analyzes the words and/or grammar of the conversation to determine the nature and properties of the transaction. The security tool then asks each user involved in the transaction to confirm the transaction. Once confirmed, the security tool initiates the transaction. In this manner, the security of personal information is improved, because the users do not need to provide personal information during the transaction. Additionally, even if the recording is taken, it is difficult to impersonate the user to initiate a transaction because the recording does not allow a malicious user to impersonate the user's voice signature.

According to an embodiment, an apparatus includes a memory and a hardware processor. The memory stores a first voice record of a first user and a second voice record of a second user. The processor receives from a device of the first user a recording of a voice conversation between the first user and the second user and compares the recording with the first voice record and the second record to determine that the voice conversation is between the first user and the second user. The processor also determines, based on a plurality of words used in the recording, that the first user and the second user intend to conduct a transaction with each other and determines, based on the plurality of words, a transaction amount for the transaction. The processor further communicates, to the device of the first user, a message that includes the transaction amount, receives, from the device of the first user, a confirmation of the transaction in response to the message, and in response to the confirmation, initiates the transaction.

According to another embodiment, a method includes storing, by a memory, a first voice record of a first user and a second voice record of a second user. The method also includes receiving, by a hardware processor communicatively coupled to the memory, from a device of the first user, a recording of a voice conversation between the first user and the second user and comparing, by the processor, the recording with the first voice record and the second record to determine that the voice conversation is between the first user and the second user. The method further includes determining, by the processor, based on a plurality of words used in the recording, that the first user and the second user intend to conduct a transaction with each other and determining, by the processor, based on the plurality of words, a transaction amount for the transaction. The method also includes communicating, by the processor, to the device of the first user, a message that includes the transaction amount, receiving, by the processor, from the device of the first user, a confirmation of the transaction in response to the message, and in response to the confirmation, initiating, by the processor, the transaction.

According to yet another embodiment, a system includes a device of a first user and a security tool. The security tool stores a first voice record of a first user and a second voice record of a second user. The security tool also receives from the device of the first user a recording of a voice conversation between the first user and the second user and compares the recording with the first voice record and the second record to determine that the voice conversation is between the first user and the second user. The security tool further determines, based on a plurality of words used in the recording, that the first user and the second user intend to conduct a transaction with each other and determines, based on the plurality of words, a transaction amount for the transaction. The security tool also communicates, to the device of the first user, a message that includes the transaction amount, receives, from the device of the first user, a confirmation of the transaction in response to the message, and in response to the confirmation, initiate the transaction.

Certain embodiments provide one or more technical advantages. For example, an embodiment improves data security by authenticating users using voice signatures. As another example, an embodiment improves data security by removing the need for users to provide personal information during a transaction. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
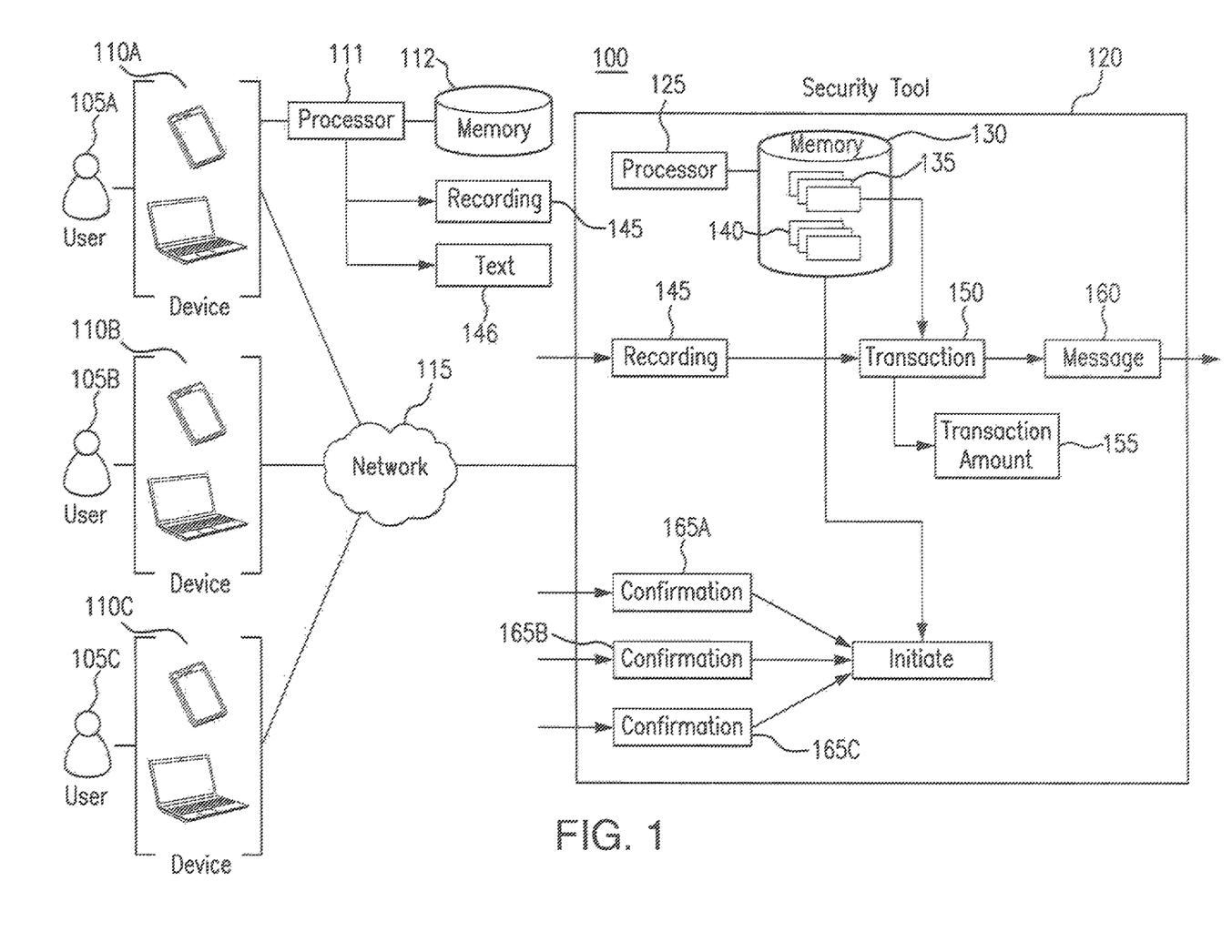
FIG. 1 illustrates an example system.
Figure 2:
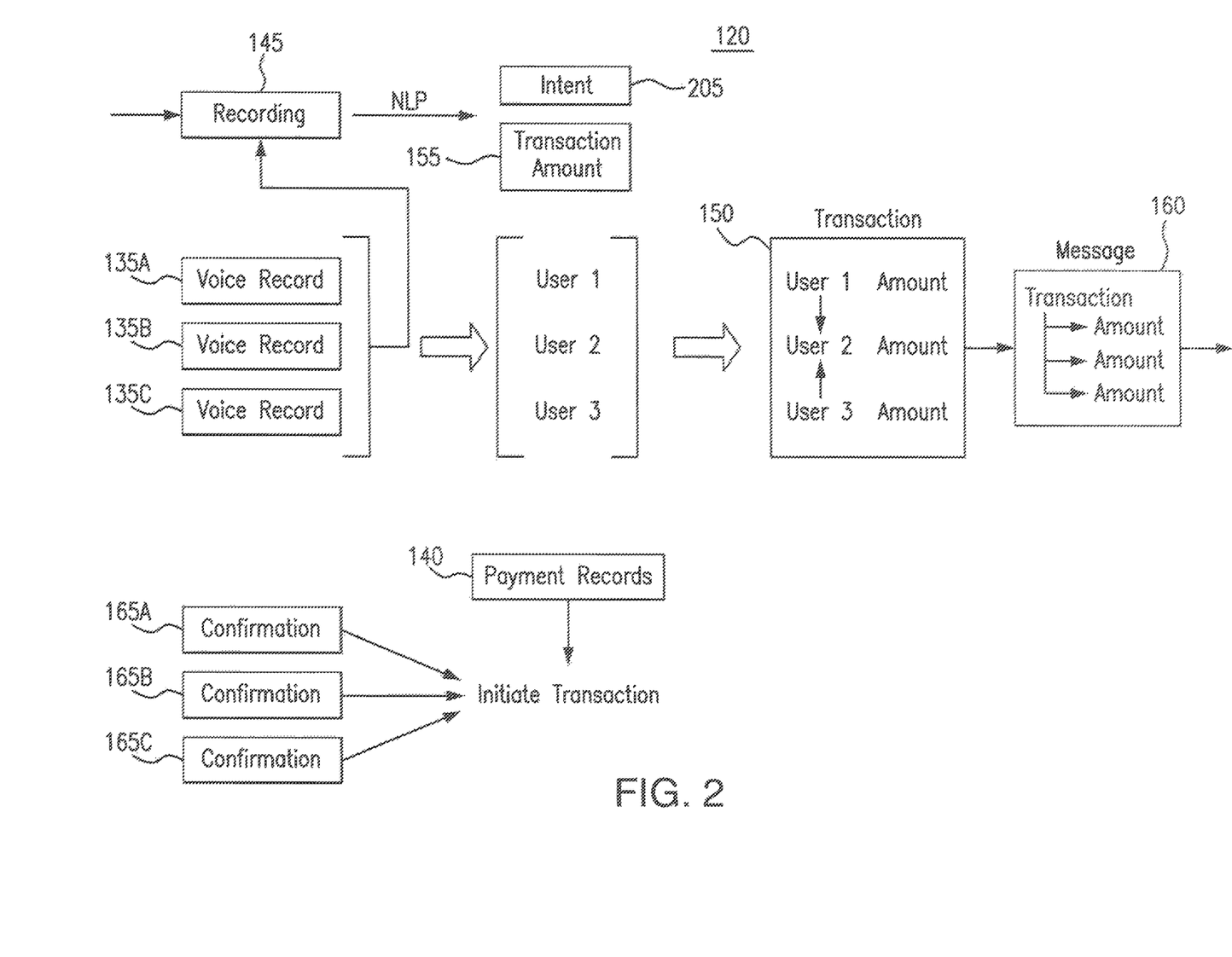
FIG. 2 illustrates an example security tool of the system of FIG. 1.
Figure 3:
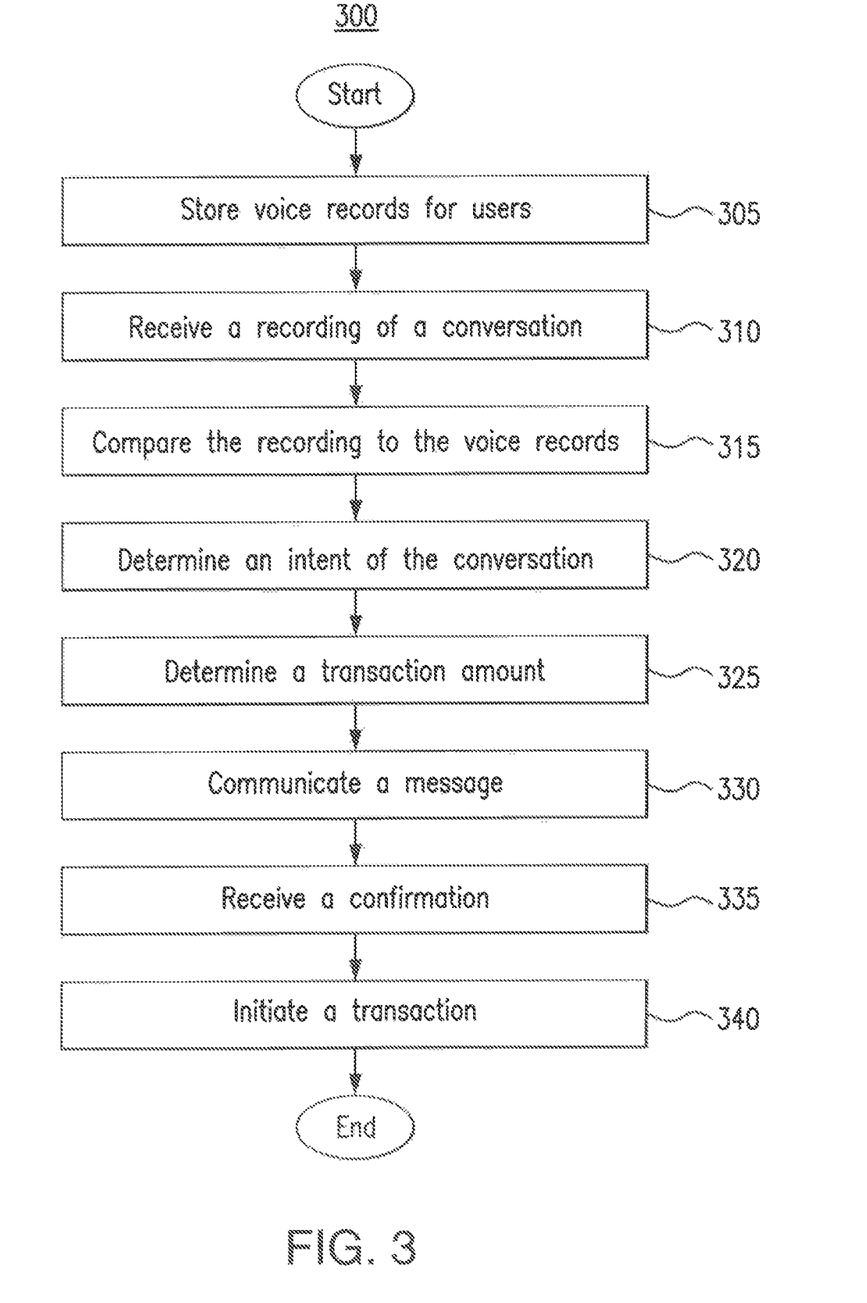
FIG. 3 is a flowchart illustrating a method for improving data security using the system of FIG. 1.

Embodiments of the present disclosure and its advantages are best understood by referring to FIGS. 1 through 3 of the drawings, like numerals being used for like and corresponding parts of the various drawings.

Online and digital transactions frequently involve the communication of personal information over networks. This personal information may be compromised in a number of ways. For example, the personal information may be taken by malicious users from any repository or device to which the personal information is communicated. As another example, the personal information may be intercepted in transit by malicious users. As yet another example, the personal information may be copied by a keylogger as the information is provided. These malicious users may then use the personal information to impersonate other users or sell the personal information to other malicious actors.

Online and digital transaction may also involve several different steps where a user provides personal information before the transaction is initiated. For example, if a user wants to make a digital purchase, a user may provide authentication credentials (e.g., username and password) to login to a website. After selecting a product or service, the user may provide identifying information such as a real name or address. The user may also provide payment information such as a card number. Each of these types of information may be provided in separate steps and in different network messages. Some researchers have found that an online or digital transaction may involve twelve or more different steps where a user's personal information is provided, communicated, and/or stored. The user's information may be compromised in each of these twelve steps. Once compromised, a malicious user may use the personal information to impersonate the user (e.g., to conduct unauthorized transactions).

This disclosure contemplates a security tool that improves the security of information (e.g., personal information) during online and digital transactions. The security tool allows two or more users to conduct a transaction with each other by analyzing the users' voices. The security tool processes a recording of a conversation involving the users and authenticates the users by comparing the recording against voice records. The security tool analyzes the words and/or grammar of the conversation to determine the nature and properties of the transaction. The security tool then asks each user involved in the transaction to confirm the transaction. Once confirmed, the security tool initiates the transaction. In this manner, the security of personal information is improved, because the users do not need to provide personal information during the transaction. Additionally, even if the recording is taken, it is difficult to impersonate the user to initiate a transaction because the recording does not allow a malicious user to impersonate the user's voice signature. The system and the data security tool will be described in more detail using FIGS. 1 through 3.

FIG. 1 illustrates an example system 100. As seen in FIG. 1, system 100 includes one or more devices 110, a network 115, and a security tool 120. Generally, users 105 can use system 100 to safely conduct transactions with one another. System 100 improves security by allowing users 105 to conduct transactions using their voices in certain embodiments.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Each device 110 includes a processor 111 and a memory 112 configured to perform any of the functions of device 110 described herein. For example, processor 111 and memory 112 may be configured to conduct and/or record audio calls and/or video calls. As another example, processor 111 and memory 112 may be configured to convert the audio of a recorded call to text. Processor 111 is any electronic circuitry, including, but not limited to microprocessors, application specific integrated circuits (ASIC), application specific instruction set processor (ASIP), and/or state machines, that communicatively couples to memory 112 and controls the operation of device 110. Processor 111 may be 8-bit, 16-bit, 32-bit, 64-bit or of any other suitable architecture. Processor 111 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 111 may include other hardware that operates software to control and process information. Processor 111 executes software stored on memory to perform any of the functions described herein. Processor 111 controls the operation and administration of device 110 by processing information received from devices 110, network 115, and memory 112. Processor 111 may be a programmable logic device, a microcontroller, a microprocessor, any suitable processing device, or any suitable combination of the preceding. Processor 111 is not limited to a single processing device and may encompass multiple processing devices.

Memory 112 may store, either permanently or temporarily, data, operational software, or other information for processor 111. Memory 112 may include any one or a combination of volatile or non-volatile local or remote devices suitable for storing information. For example, memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 112, a disk, a CD, or a flash drive. In particular embodiments, the software may include an application executable by processor 111 to perform one or more of the functions described herein.

User 105 may use device 110 to conduct online or digital transactions. For example, user 105 may use device 110 to make a purchase. As another example, user 105 may use device 110 to send or receive money to and from other users 105. Generally, user 105 provides personal information before a transaction is conducted. For example, user 105 may provide identifying information such as a name and address. As another example, user 105 may provide payment information such as a card number or account number. User 105 may provide this information by typing the information into the device 110. Each type of information may be provided in a separate and different step of the transaction process. Researchers have found that online and digital transactions may involve twelve or more different steps before a transaction is actually initiated. Personal information provided by user 105 may be compromised at each of these steps. For example, personal information may be intercepted during transport through a network. As another example, personal information may be recorded and taken by a keylogger when user 105 provides the personal information. The compromised personal information may be used by a malicious user to impersonate user 105 and to conduct undesired transactions.

Users 105 may use devices 110 to conduct transactions with one another. As seen in FIG. 1, user 105A has one or more devices 110A, user 105B has one or more devices 110B, and user 105C uses one or more devices 110C. Each user 105 may use their devices 110 to communicate with other users 105 or other components of system 100. To conduct a transaction conventionally, users 105 may instruct an application on their devices 110 to conduct a transaction with another user 105. The application collects information about the user 105 (e.g., username, password, address) and payment information (e.g., card number or account number) and conducts the transaction. User 105 may provide this information by typing the information into the device 110. However, this information may be exposed or taken when communicated over the network. This information may also be logged and taken by a keylogger when the information is provided by the user.

This disclosure contemplates an unconventional process for initiating and conducting transactions that protects the personal information of a user. In this process, user 105A may use device 110A to have an audio or video call with one or more of users 105B and 105C. During the audio or video call, users 105A, 105B, and/or 105C can use their voices to set up a transaction between or amongst the users 105. By using audio to set up a call, it becomes less likely that personal information will be compromised. For example, because the users are not typing in transaction details on a device, a keylogger may not be able to record and take the typed information. Additionally, because the network messages communicated by the devices is a recording of an audio signal rather than a data message containing the personal information of a user, even if that network message gets intercepted by a malicious user, it is unlikely that the malicious user will be able to glean personal information of the user from the network message.

As an example operation, user 105A may initiate an audio or video call with users 105B and 105C using device 110A. Users 105B and 105C may conduct the audio or video call using devices 110B and 110C. During the call, users 105A and 105C may agree to send an amount of money to user 105B. Device 110A (using processor 111 and memory 112) records the audio or video call to generate recording 145. Recording 145 is communicated to other components of system 100 (e.g., security tool 120) to initiate a transaction between the users 105. In certain embodiments, device 110A may also convert recording 145 (e.g., through natural language processing) to a text 146. Text 146 may be a transcription of the audio of recording 145. As a result, text 146 may be a text transcription of what was said during an audio or video call. This text 146 can be preserved in device 110 so that user 105 can review the conversation at a later time (e.g., to confirm that details of a transaction are accurate).

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Security tool 120 improves the security of a transaction. As seen in FIG. 1, security tool 120 includes a processor 125 and a memory 130. This disclosure contemplates processor 125 and memory 130 being configured to perform any of the functions of security tool 120 described herein. Generally, security tool 120 allows users 105 to conduct transactions using voice recordings. This process improves the security of the transaction in certain embodiments because even if a voice recording is taken by a malicious user, it is difficult to use a recording of a call to impersonate a user to conduct undesired transactions.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware that operates software to control and process information. Processor 125 executes software stored on memory to perform any of the functions described herein. Processor 125 controls the operation and administration of security tool 120 by processing information received from devices 110, network 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Security tool 120 stores one or more voice records 135. Each voice record may include a voice signature for a user 105. In the example of FIG. 1, user 105A, 105B, and 105C may each have a voice record 135 stored in security tool 120. These voice records 135 uniquely identify the voices of user 105A, 105B, and 105C. For example, a voice record 135 may include information that allows security tool 120 to identify a user 105 using an audio recording provided by the user 105. As another example, voice record 135 may include an audio passphrase that a user 105 can speak to authenticate user 105. Security 120 may use voice records 135 to determine which users 105 are speaking in an audio recording. In particular embodiments, voice records 135 may be provided by users 105 when registering with security tool 120. For example, users 105 may supply an audio passphrase that is included in voice record 135. As another example, user 105 may speak certain words, phrases, or sentences that allow security tool 120 to capture a voice signature for the user. That voice signature may be included in voice record 135.

Security tool 120 stores one or more payment records 140. Payment records 140 may contain information pertaining to how a user 105 pays for transactions initiated by security tool 120. For example, payment records 140 may include card numbers and/or account numbers for a user 105. Security tool 120 may use payment records 140 to initiate and/or conduct transactions. In certain embodiments, payment records 140 may be provided by user 105. For example, user 105 may supply card numbers and/or account numbers that are stored by security tool 120. Security tool 120 may then retrieve these payment records 140 when user 105 wants to conduct a transaction.

Security tool 120 receives a recording 145. In certain embodiments, recording 145 may be received from a device 110 of a user 105. In certain embodiments, processor 111 of a device 110 generates recording 145. Recording 145 may be of an audio or video call conducted by user 105 using the device 110. Recording 145 may capture the audio of what was said during the audio or video call. Security tool 120 processes and analyzes recording 145 to conduct transactions.

For example, security tool 120 may use voice records 135 to analyze the audio signals within recording 145 to determine the users 105 in recording 145. These users 145 may speak an audio passphrase in recording 145 or these users may have a particular voice signature identified by voice record 135. Security tool 120 may also analyze the words in recording 145 to determine an intent for the transaction 150.

Security tool 120 may also analyze the words of recording 145 to determine properties of transaction 150. For example, security tool 120 may analyze the words of recording 145 to determine a transaction amount 155. Transaction amount 155 may be an amount of money that is involved in transaction 150. For example, security tool 120 may analyze recording 145 to determine that users 105A, 105B, and 105C are in an audio call with one another. Security tool 120 may analyze the words of recording 145 to determine that user 105A and 105C intend to send amounts of money to user 105B. Security tool may also analyze the words of recording 145 to determine the transactions amounts 155 for users 105A and 105B. Based on these determined intents, security tool 120 automatically initiates the confirmation process to conduct the transaction contemplated by the users 105 in recording 145.

Security tool 120 generates message 160 based on transaction 150. Message 160 may indicate the details of transaction 150. Such as, for example, the identities of users 105 involved in transaction 150 and the transaction amounts 155. Security tool 120 communicates message 160 to one or more of the devices 110 involved in recording 145 and/or transaction 150. Message 160 may request each user 105 or device 110 to confirm transaction 150.

Users 105 may use devices 110 to receive and respond to message 160. User 105 may review the details of transaction 150 and transaction amount 155 on device 110. User 105 may confirm the details of the transaction using device 110. When confirmed, device 110 communicates a confirmation 165 back to security tool 120. Using the previous example, users 105A, 105B, and 105C may each receive message 160 on devices 110A, 110B, and 110C. Message 160 may indicate that user 105A and user 105C are sending certain amounts of money to user 105B. User 105A uses device 110A to confirm the transaction, user 105B uses device 110B to confirm the transaction, and user 105C uses device 110C to confirm the transaction.

Security tool 120 receives confirmations 165 from devices 110. In the example of FIG. 1, security tool 120 receives confirmation 165A from 110A, confirmation 165B from device 110B, and confirmation 165C from device 110C. Each confirmation 165 indicates that a corresponding user 105 has confirmed transaction 150. When security tool 120 determines that each user 105 involved in the transaction 150 has confirmed the transaction 150, security tool 120 initiates the transaction. In certain embodiments, users 105 may confirm a transaction by further providing biometric information. For example, a user 105 may provide a fingerprint to confirm the transaction 150. User 105 may provide the fingerprint using device 110. When device 110 validates the fingerprint provided by user 105, device 110 may communicate confirmation 165 to security tool 120.

In certain embodiment, security tool 120 may retrieve and apply payment records 140 to initiate the transaction. Security tool 120 may have retrieved payment records 140 when security tool 120 determined that certain users 105 intended to conduct transaction 150. Using the previous example, security tool 120 may retrieve payment records 140 for users 105A and 105B. When security tool 120 determines that users 105A and 105C intend to send certain amount of money to user 105B, security tool 120 may further retrieve payment records 140 for user 105B to determine where to send the money received from users 105A and 105C.

An example operation of system 100 is as follows. Users 105A, 105B, and 105C may begin an audio or video call using devices 110A, 110B, and 110C. Devices 110A, 110B, and 110C record the call as the call happens. Recording 145 of the call is communicated to security tool 120. In some embodiments, recording 145 is communicated to security tool 120 as the call is happening (e.g., as a stream). In some embodiments, recording 145 is communicated to security tool 120 after the call ends. During the call, user 105A may speak words that communicate an intent to send $20 to user 105B. Likewise, user 105C may speak words that communicate an intent to send $30 to user 105B. Recording 145 captures these spoken words.

Security tool 120 receives and processes recording 145. For example, security tool 120 may use voice records 135 to determine that users 105A, 105B, and 105C are on the call. Users 105A, 105B, and 105C may have spoken an audio passphrase during the call to indicate to security tool 120 that they are the users 105 are on the call. Security tool 120 may also have recognized the voices of users 105A, 105B, and 105C by comparing voice signatures (e.g., the frequency and tone) in voice records 135 with recording 145.

Security tool 120 also analyzes the words, phrases, and sentences spoken in recording 145 (e.g., through natural language processing) to determine an intent of the users 105 in the recording 145. Security tool 120 may determine that user 105A intends to send $20 to user 105B and that user 105C intends to send $30 to user 105B. In response, security tool 120 generates message 160 that indicates these transaction details and communicates message 160 to devices 110A, 110B, and 110C.

Users 105A, 105B, and 105C may then use devices 110A, 110B, and 110C to view message 160 and to confirm transaction 150. Devices 110A, 110B, and 110C communicate confirmations 165A, 165B, and 165C to security tool 120. When security tool 120 receives these confirmations, security tool 120 initiates the transaction 150. $20 may then be sent from an account of user 105A to an account of user 105B. Likewise, $30 may be sent from an account of user 105C to the account of user 105B. In this manner, users 105A, 105B, and 105C are able to initiate and conduct transactions using audio, thereby improving the security of the transaction and the users' personal information.

FIG. 2 illustrates an example security tool 120 of the system 100 of FIG. 1. Generally, security tool 120 allows users to conduct online and digital transactions using the users' voices. In certain embodiments, security tool 120 improves the security of personal information exchanged during online and digital transactions by removing the need for users to provide the personal information to initiate or conduct the transaction.

Security tool 120 receives a recording 145. Recording 145 may be a recording of an audio or video call. Recording 145 includes an audio component that indicates what was said during the audio or video call. For example, if three users were on an audio or video call, then recording 145 may be played back to reveal what the three users said during the call. Security tool 120 uses recording 145 to determine whether the users in recording 145 are conducting an online or digital transaction with each other.

Security tool 120 stores voice records 135. Voice records 135 may be provided by users who have registered with security tool 120. Each voice record 135 belongs to a user. The user may have provided voice record 135 by speaking into a device of the user when the user registered with security tool 120. Voice record 135 may include an audio passphrase spoken by the user. As another example, voice records 135 may include a voice signature of the user. The voice signature may be determined by analyzing qualities of the user's voice, such as, for example, the frequency and/or tone of the user's voice as the user speaks into the device during registration. Security tool 120 uses voice records 135 to determine which users are participating in a call recorded in recording 145. For example, security tool 120 may determine that there are three distinct voices in recording 145. Security tool 120 may compare these three voices to voice records 135 to determine which users are on the call. For example, security tool 120 may compare the frequencies and/or tones of these voices with the frequencies and/or tones indicated by voice records 135. As another example, security tool 120 may detect audio passphrases spoken by these voices and compare these passphrases with the audio passphrases in voice record 135. In the example of FIG. 2, security tool 120 compares voice records 135A, 135B, and 135C with recording 145 to determine that user 1, user 2, and user 3 are the users participating on the call. Voice record 135A may belong to user 1, voice record 135B may belong to user 2, and voice record 135C may belong to user 3.

Security tool 120 may also analyze recording 145 to determine properties of a transaction. For example, security tool 120 may use natural language processing to determine an intent 205 and a transaction amount 155 for the transaction. Intent 205 may indicate that the users on the call intend to perform a certain type of transaction. Transaction amount 155 may indicate a payment amount for the transaction. In certain embodiments, security tool 120 may use natural language processing to analyze the words spoken in recording 145. For example, security tool 120 may use natural language processing to analyze the words, phrases, and sentences spoken by the users in recording 145. By analyzing these words, phrases, and sentences, security tool 120 determines an intent 205. In the example of FIG. 2, security tool 120 may determine that users 1 and 3 intend to pay certain amounts to user 2. Security tool 120 may then determine these amounts and indicate them in transaction amount 155.

Security tool 120 generates a transaction 150 based on intent 205 and transaction amount 155. Transaction 150 may indicate the users involved in the transaction, the type of transaction, and the amounts for each user involved in the transaction. In the example of FIG. 2, transaction 150 indicates that users 1 and 3 are paying certain amounts to user 2 and that user 2 is receiving a certain amount.

Security tool 120 generates a message 160. Message 160 may indicate the transaction 150 and the various amounts involved in transaction 150. Message 160 may request confirmation of transaction 150. Security tool 120 communicates message 160 to the users involved in transaction 150. For example, security tool 120 may communicate message 160 to the devices of the users.

The devices of the users may display message 160 when message 160 is received. The devices may ask the users to confirm transaction 150 in response to receiving message 160. The users may confirm the transaction by pressing a button on the device. The button may be a physical button or a software button displayed on the screen of the device. In some embodiments, the users may confirm the transaction by providing biometric information. Such as, for example, a fingerprint through a fingerprint scanner of the device. When a user has confirmed the transaction, the device communicates a confirmation 165 to security tool 120.

Security tool 120 waits to receive confirmations 165 from each user involved in the transaction. In the example of FIG. 2, security tool 120 waits until it receives confirmations 165A, 165B, and 165C from the users involved in transaction 150. Confirmation 165A may be sent by user 1. Confirmation 165B may be sent by user 2. Confirmation 165C may be sent by user 3. When security tool 120 has received confirmations 165 from each user involved in transaction 150, security tool 120 initiates transaction 150.

In certain embodiments, security tool 120 may retrieve payment records 140 to be used in initiating the transaction. Payment records 140 may include payment information and/or accounts for each user involved in the transaction. For example, payment records 140 may include account numbers and/or card numbers for each user. Security tool 120 may retrieve payment records 140 in response to the determination that users 1, 2, and 3 are involved in transaction 150. In that instance, security tool 120 retrieves that payment records 140 for each of users 1, 2, and 3. In the example of FIG. 2, after initiating the transaction using the payment records 140 of users 1, 2, and 3, an amount is transferred from user 1 to user 2, and another amount is transferred from user 3 to user 2.

By conducting transactions in this manner, security tool 120 improves the security of personal information used during online and digital transactions. For example, by using recording 145 to initiate and conduct a transaction, security tool 120 removes the need for each of the users involved to provide personal information to initiate or conduct a transaction. Even if recording 145 is intercepted by a malicious user during transport to or from security tool 120, the malicious user is unlikely to be able to use recording 145 to impersonate any of the users involved in recording 145 to conduct undesired transactions. This is because the malicious user is unlikely to determine the identities of the users based solely on the voices of the users in recording 145. Furthermore, it is unlikely that the malicious user can impersonate the users based solely on a recorded call between the users. As a result, security tool 120 improves the security of personal information used to conduct transactions.

FIG. 3 is a flowchart illustrating a method 300 for improving data security using the system 100 of FIG. 1. In certain embodiments, security tool 120 performs the steps of method 300. By performing method 300, security tool 120 improves the security of personal information used to initiate or conduct online and digital transactions.

Security tool 120 begins by storing voice records for users in step 305. The voice records may be used to identify users on an audio or video call. Each user may provide a voice record by speaking into a device of the user. The voice record may include an audio passphrase and/or a voice signature for the user. Security tool 120 receives a recording of a conversation in step 310. The recording may be of an audio or video call. The recording includes an audio component that includes the voices of the users on the call. Security tool 120 analyzes the recording to determine the users on the call and the transaction details. Security tool 120 compares the recording to the voice records in step 315. For example, security tool 120 may use the voice records to determine the voice signatures of the users on the call. As another example, security tool 120 may use the voice records to determine audio passphrases spoken by the users on the call. In this manner, security tool 120 identifies each user on the call. Security tool 120 determines an intent of the conversation in step 320.

Security tool 120 may use natural language processing to analyze the words, phrases, and sentences of each user in the recording. Based on these words, phrases, and sentences, security tool 120 may determine that the users intend to conduct a certain type of transaction with each other. In step 325, security tool 120 determines a transaction amount. Security tool 120 may use natural language processing to determine the various amounts involved in the transaction that the users intend to conduct. For example, each user may correspond to a certain amount in the transaction. The users may each pay a portion of a total amount involved in a transaction. Security tool 120 communicates a message in step 330. The message may indicate that the transaction and the transaction amounts. Security tool 120 communicates the message to the devices of each user involved in the transaction. The message may request confirmation from each user of the transaction.

Security tool 120 receives a confirmation in step 335. Confirmation may be to confirm the transaction by a user. Security tool 120 may wait to initiate the transaction until security tool 120 has received a confirmation from each user involved in the transaction. The users may supply the confirmations using physical or soft buttons on the device of the user. The users may also provide the confirmation by providing biometric information. Such as, for example, a fingerprint using the device of the user. Security tool 120 initiates the transaction after receiving confirmations after receiving confirmations from each user involved in the transaction in step 340.

Modifications, additions, or omissions may be made to method 300 depicted in FIG. 3. Method 300 may include more, fewer, or other steps. For example, steps may be performed in parallel or in any suitable order. While discussed as security tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory configured to store:
      a first voice record of a first user; and
      a second voice record of a second user; and
   a hardware processor communicatively coupled to the memory, the hardware processor configured to:
      receive from a device of the first user a recording of a voice conversation between the first user and the second user, wherein:
        the voice conversation comprises a first passphrase spoken by the first user, and the first passphrase is used to uniquely identify the first user, and
        the voice conversation further comprises a second passphrase spoken by the second user, and the second passphrase is used to uniquely identify the second user;
      compare the recording with the first voice record and the second record to determine that the voice conversation is between the first user and the second user, wherein determining that the voice conversation is between the first user and the second user comprises:
        comparing the first passphrase with a first previously provided passphrase spoken by the first user in the first voice record;
        determining that the first passphrase corresponds to the first previously provided passphrase;
        comparing the second passphrase with a second previously provided passphrase spoken by the second user in the second voice record; and
        determining that the second passphrase corresponds to the second previously provided passphrase;
      determine, based on a plurality of words used in the recording, that the first user and the second user intend to conduct a transaction with each other;
      determine, based on the plurality of words, a transaction amount for the transaction;

communicate, to the device of the first user, a message comprising the transaction amount;

receive, from the device of the first user, a confirmation of the transaction in response to the message, wherein the confirmation is in response to confirming the identity of the first user by verifying that the first user uttered the first passphrase during the recording, and confirming the identity of the second user by verifying that the second user uttered the second passphrase during the recording; and in response to the confirmation, initiate the transaction.

2. The apparatus of claim 1, wherein:

the memory is further configured to store a third voice record of a third user; and the hardware processor is further configured to:

compare the recording with the third voice record to determine that the voice conversation includes the third user, wherein:

the voice conversation further comprises a third passphrase spoken by the third user, and the third passphrase is used to uniquely identify the third user;

determining that the voice conversation includes the third user comprises:

comparing the third passphrase with a third previously provided passphrase spoken by the third user in the third voice record; and determining that the third passphrase corresponds to the third previously provided passphrase;

determine, based on the plurality of words, that a portion of the transaction amount is to be paid by the third user;

communicate, to a device of the third user, the message comprising the portion of the transaction amount; and receive, from the device of the third user, a confirmation of the transaction in response to the message, wherein initiating the transaction is in further response to the confirmation from the device of the third user.

3. The apparatus of claim 1, wherein the device of the first user is configured to convert the recording to a text file that includes the plurality of words.

4. The apparatus of claim 1, wherein the first voice record is provided by the first user speaking into the device of the first user.

5. The apparatus of claim 1, wherein the hardware processor is further configured to retrieve from the memory a payment method of the first user in response to determining that the first user and the second user intend to conduct a transaction with each other, the first message further comprises the payment method.

6. The apparatus of claim 1, wherein the confirmation of the transaction comprises an indication that the first user provided a biometric identifier in response to the first message.

7. The apparatus of claim 1, wherein the hardware processor is further configured to receive a second confirmation of the transaction from the second user before initiating the transaction.

8. A method comprising:

storing, by a memory, a first voice record of a first user and a second voice record of a second user;

receiving, by a hardware processor communicatively coupled to the memory, from a device of the first user, a recording of a voice conversation between the first user and the second user, wherein:

the voice conversation comprises a first passphrase spoken by the first user, and the first passphrase is used to uniquely identify the first user, and the voice conversation further comprises a second passphrase spoken by the second user, and the second passphrase is used to uniquely identify the second user;

comparing, by the processor, the recording with the first voice record and the second record to determine that the voice conversation is between the first user and the second user, wherein determining that the voice conversation is between the first user and the second user comprises:

comparing the first passphrase with a first previously provided passphrase spoken by the first user in the first voice record;

determining that the first passphrase corresponds to the first previously provided passphrase;

comparing the second passphrase with a second previously provided passphrase spoken by the second user in the second voice record; and determining that the second passphrase corresponds to the second previously provided passphrase;

determining, by the processor, based on a plurality of words used in the recording, that the first user and the second user intend to conduct a transaction with each other;

determining, by the processor, based on the plurality of words, a transaction amount for the transaction;

communicating, by the processor, to the device of the first user, a message comprising the transaction amount;

receiving, by the processor, from the device of the first user, a confirmation of the transaction in response to the message, wherein the confirmation is in response to confirming the identity of the first user by verifying that the first user uttered the first passphrase during the recording, and confirming the identity of the second user by verifying that the second user uttered the second passphrase during the recording; and in response to the confirmation, initiating, by the processor, the transaction.

9. The method of claim 8, wherein:

storing, by the memory, a third voice record of a third user;

comparing, by the processor, the recording with the third voice record to determine that the voice conversation includes the third user, wherein:

the voice conversation further comprises a third passphrase spoken by the third user, and the third passphrase is used to uniquely identify the third user;

determining that the voice conversation includes the third user comprises:

comparing the third passphrase with a third previously provided passphrase spoken by the third user in the third voice record; and determining that the third passphrase corresponds to the third previously provided passphrase;

determining, by the processor, based on the plurality of words, that a portion of the transaction amount is to be paid by the third user;

communicating, by the processor, to a device of the third user, the message comprising the portion of the transaction amount; and receiving, by the processor, from the device of the third user, a confirmation of the transaction in response to the message, wherein initiating the transaction is in further response to the confirmation from the device of the third user.

10. The method of claim 8, wherein the device of the first user is configured to convert the recording to a text file that includes the plurality of words.

11. The method of claim 8, wherein the first voice record is provided by the first user speaking into the device of the first user.

12. The method of claim 8, further comprising retrieving, by the processor, from the memory a payment method of the first user in response to determining that the first user and the second user intend to conduct a transaction with each other, the first message further comprises the payment method.

13. The method of claim 8, wherein the confirmation of the transaction comprises an indication that the first user provided a biometric identifier in response to the first message.

14. The method of claim 8, further comprising receiving, by the processor, a second confirmation of the transaction from the second user before initiating the transaction.

15. A system comprising:
    a device of a first user; and
    a security tool configured to:
        store a first voice record of a first user;
        store a second voice record of a second user;
        receive from the device of the first user a recording of a voice conversation between the first user and the second user, wherein:
            the voice conversation comprises a first passphrase spoken by the first user, and the first passphrase is used to uniquely identify the first user, and
            the voice conversation further comprises a second passphrase spoken by the second user, and the second passphrase is used to uniquely identify the second user;
        compare the recording with the first voice record and the second record to determine that the voice conversation is between the first user and the second user, wherein:
            the voice conversation further comprises a third passphrase spoken by the third user, and the third passphrase is used to uniquely identify the third user;
            determining that the voice conversation includes the third user comprises:
                comparing the third passphrase with a third previously provided passphrase spoken by the third user in the third voice record; and
                determining that the third passphrase corresponds to the third previously provided passphrase;
        determine, based on a plurality of words used in the recording, that the first user and the second user intend to conduct a transaction with each other;
        determine, based on the plurality of words, a transaction amount for the transaction;
        communicate, to the device of the first user, a message comprising the transaction amount;
        receive, from the device of the first user, a confirmation of the transaction in response to the message, wherein the confirmation is in response to confirming the identity of the first user by verifying that the first user uttered the first passphrase during the recording, and confirming the identity of the second user by verifying that the second user uttered the second passphrase during the recording; and
        in response to the confirmation, initiate the transaction.

16. The system of claim 15, wherein the security tool is further configured to:
    store a third voice record of a third user;
    compare the recording with the third voice record to determine that the voice conversation includes the third user, wherein determining that the voice conversation includes the third user comprises:
        comparing a third passphrase with a third previously provided passphrase spoken by the third user in the third voice record; and
        determining that the third passphrase corresponds to the third previously provided passphrase;
    determine, based on the plurality of words, that a portion of the transaction amount is to be paid by the third user;
    communicate, to a device of the third user, the message comprising the portion of the transaction amount; and
    receive, from the device of the third user, a confirmation of the transaction in response to the message, wherein initiating the transaction is in further response to the confirmation from the device of the third user.

17. The system of claim 15, wherein the first voice record is provided by the first user speaking into the device of the first user.

18. The system of claim 15, wherein the security tool is further configured to retrieve a payment method of the first user in response to determining that the first user and the second user intend to conduct a transaction with each other, the first message further comprises the payment method.

19. The system of claim 15, wherein the confirmation of the transaction comprises an indication that the first user provided a biometric identifier in response to the first message.

20. The system of claim 15, wherein the security tool is further configured to receive a second confirmation of the transaction from the second user before initiating the transaction.

* * * * *